United States Patent
Kain et al.

(10) Patent No.: US 11,233,406 B2
(45) Date of Patent: Jan. 25, 2022

(54) POWER BALANCING COMMUNICATION FOR BATTERY MANAGEMENT

(71) Applicant: Infineon Technologies AG, Neubiberg (DE)

(72) Inventors: Clemens Kain, Kammern (AT); Guenter Hofer, St. Oswald (AT); Jesus Ruiz Sevillano, Zorneding (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/684,335

(22) Filed: Nov. 14, 2019

(65) Prior Publication Data

US 2020/0083720 A1    Mar. 12, 2020

Related U.S. Application Data

(63) Continuation of application No. 15/169,475, filed on May 31, 2016, now Pat. No. 10,505,374.

(51) Int. Cl.
*H04L 12/42* (2006.01)
*H02J 7/00* (2006.01)
(Continued)

(52) U.S. Cl.
CPC ............ *H02J 7/0014* (2013.01); *B60L 58/22* (2019.02); *H02J 7/0021* (2013.01);
(Continued)

(58) Field of Classification Search
CPC .... H02J 7/0014; H02J 7/0021; H02J 7/00034; H02J 13/0003; H02J 13/00017;
(Continued)

(56) References Cited

U.S. PATENT DOCUMENTS 6,005,869 A * 12/1999 Sakai .................. H04L 12/6418
370/452
7,801,028 B2 9/2010 Jin et al.
(Continued)

FOREIGN PATENT DOCUMENTS

CN 101971575 A 2/2011
CN 103299652 A 9/2013
(Continued)

OTHER PUBLICATIONS

Electromobility—Battery Management for Electric Vehicles, Infineon Technologies Presentation, retrieved from http://www.infineon.com/cms/media/eLearning/Automotive/eMobilityBatteryManagement/IG087-eMobilityBatteryManagement-FINALS/IG087-eMobilityBatteryManagementlindex.htm on May 12, 2016, 1 pp.
(Continued)

*Primary Examiner* — Richard Isla
*Assistant Examiner* — Johali A Torres Ruiz
(74) *Attorney, Agent, or Firm* — Shumaker & Sieffert, P.A.

(57) ABSTRACT

A battery management system is described that includes a controller configured to control electrical charging and discharging of a plurality of blocks of a battery. The battery management system also includes an inter-block communication network including a master node and a plurality of slave nodes arranged in a ring-type daisy-chain configuration with the master node. The master node is coupled to the controller and configured to initiate all command messages sent through the inter-block communication network and terminate all reply messages sent through the inter-block communication network. The plurality of slave nodes is bounded by an initial node coupled to the master node and a last node coupled to the master node.

20 Claims, 13 Drawing Sheets

(51) Int. Cl.
  *H02J 13/00*   (2006.01)
  *B60L 58/22*   (2019.01)

(52) U.S. Cl.
  CPC .......... *H02J 13/0003* (2013.01); *H04L 12/42* (2013.01); *H02J 7/00034* (2020.01); *Y02T 10/70* (2013.01); *Y02T 90/16* (2013.01)

(58) Field of Classification Search
  CPC .......... B60L 58/22; H04L 12/42; Y02T 10/70; Y02T 10/7044; Y02T 10/7061; Y02T 10/7055; Y02T 90/16; H01M 10/425; H01M 10/44
  See application file for complete search history.

(56) References Cited

U.S. PATENT DOCUMENTS

| | | | |
|---|---|---|---|
| 2004/0008719 | A1 | 1/2004 | Ying |
| 2006/0271805 | A1 | 11/2006 | Pearce et al. |
| 2009/0168643 | A1* | 7/2009 | Jin ........................ H04L 12/437 370/222 |
| 2010/0085885 | A1* | 4/2010 | Sakurada .............. H04L 12/422 370/252 |
| 2010/0150162 | A1 | 6/2010 | Nakayama |
| 2010/0295382 | A1* | 11/2010 | Tae ...................... G01R 31/396 307/150 |
| 2011/0080138 | A1* | 4/2011 | Nakanishi ............ H02J 7/0016 320/116 |
| 2014/0281079 | A1 | 9/2014 | Biskup |
| 2015/0019771 | A1 | 1/2015 | DeGreef et al. |
| 2015/0104673 | A1* | 4/2015 | De Greef .................. B60L 3/12 429/7 |
| 2015/0309121 | A1 | 10/2015 | Butzmann |
| 2016/0233709 | A1* | 8/2016 | Lee ......................... H02J 7/007 |
| 2016/0254667 | A1 | 9/2016 | Lee |
| 2016/0275783 | A1* | 9/2016 | Lewonig ............... H04L 12/423 |
| 2017/0346308 | A1 | 11/2017 | Kain et al. |

FOREIGN PATENT DOCUMENTS

| | | |
|---|---|---|
| CN | 103888333 A | 6/2014 |
| CN | 104579876 A | 4/2015 |

OTHER PUBLICATIONS

LTC6804-1/LTC6804-2, Multicell Battery Monitors, Linear Technology, Jun. 2014, 74 pp.

First Office Action and Search Report, and translation thereof, from counterpart Chinese Application No. P01710392284.7, dated Feb. 2, 2019, 28 pp.

Prosecution History from U.S. Appl. No. 15/169,475, dated Oct. 12, 2018 through Aug. 8, 2019, 64 pp.

\* cited by examiner

Version with constant MoB or MoT Configuration — 500A

MoB

| RX: 256bit/ 0.025W | RX: 256bit/ 0.025W | RX: 256bit/ 0.025W | RX: 256bit/ 0.025W |
| TX: 384bit/ 3.84W  | TX: 384bit/ 3.84W  | TX: 384bit/ 3.84W  | TX: 384bit/ 3.84W  |
→ FN (MOT)

MoB

| RX: 256bit/ 0.025W | RX: 256bit/ 0.025W | RX: 512bit/ 0.05W | RX: 512bit/ 0.05W |
| TX: 384bit/ 3.84W  | TX: 384bit/ 3.84W  | TX: 768bit/ 7.68W | TX: 768bit/ 7.68W |
→ FN (MOT)

Power Consumption for two Commands

| RX: 512bit/ 0.05W |
| TX: 768bit/ 7.68W |

FIG. 5E

POWER BALANCING COMMUNICATION FOR BATTERY MANAGEMENT

The present application is a continuation of U.S. application Ser. No. 15/169,475, filed on May 31, 2016, the entirety of which is hereby incorporated by reference.

TECHNICAL FIELD

The following disclosure relates to battery management systems.

BACKGROUND

A controller of a battery management system may coordinate the charging and discharging of a high-voltage battery system to ensure that each block or battery cell discharges and charges to the same voltage level. The battery management system may rely on a daisy-chained communication network (e.g., an inter-block communication network) that communicatively couples the controller to each block. The controller may act as a master node located at an initial position in the network and the respective monitoring and balancing circuits (also referred to herein as "balancing and monitoring circuits") assigned to each block may act as individual slave nodes located at subsequent positions in the network.

During a broadcast phase of the network, the slave nodes may listen to a low-side bus interface and replicate broadcast data received via the low-side bus interface, via a high-side bus interface and up the chain, until the broadcast data reaches an addressed node. During a reply phase of the network, the direction of bus communication may be inverted. The addressed node may reply to the broadcast by transmitting reply data via the high-side bus interface and back down the chain. Each subsequent slave node in the network, below the addressed node, may replicate the reply data received via the high side bus interface to the low side bus interface until the reply data reaches the master node.

Each slave node may draw power needed for each phase of communication on the network from its respective battery block. By having to more frequently replicate broadcast and replies on the network, the slave nodes that are positioned towards the start of the chain (e.g., nearest to the master node) may consume more power, over time, than the slave nodes located near the end of the chain (e.g., furthest from the master node). For example, depending on the position of a particular node along the chain, the node may have to communicate a different quantity of bits and may have a different communication load (e.g., due to a variation in wire length and parasitic loads).

Therefore, implementing an inter-block communication network such as this may lead to an overall imbalance in communication related power consumption amongst the blocks. Since imbalance in the cell system leads to longer charging times and less overall battery capacity, a consistent imbalance in power consumption amongst the blocks due to intrinsically necessary communication power draw is undesired.

SUMMARY

In general, circuits and techniques are described for enabling a battery management system to balance the power being drawn by the blocks of an inter-block communication network. Rather than automatically terminate a command message at an addressed node in the inter-block communication network, or automatically inverse the direction of communications being transmitted during the reply phase of the inter-block communication network, an example battery management system may cause command and reply messages to move through the communication network so that, over-time, each node in the network draws approximately the same amount of communication related power from its respective block.

In one example, the disclosure is directed to a battery management system that includes a controller configured to control electrical charging and discharging of a plurality of blocks of a battery, and an inter-block communication network. The inter-block communication network includes a master node and a plurality of slave nodes arranged in a ring-type daisy-chain configuration with the master node, the master node being coupled to the controller and configured to initiate all command messages sent through the inter-block communication network and terminate all reply messages sent through the inter-block communication network, and the plurality of slave nodes being bounded by an initial node coupled to the master node and a last node coupled to the master node.

In another example, the disclosure is directed to a method that includes transmitting, by a controller of a battery management system, from a master node of an inter-block communication network and via an initial node from a plurality of slave nodes of the inter-block communication network, a first command to a first addressed node from the plurality of slave nodes, and responsive to transmitting the first command, receiving, by the controller, via a last node from the plurality of slave nodes, a first reply from the first addressed node. The method further includes after receiving the first reply, transmitting, by the controller, from the master node, via the last node, a second command to a second addressed node from the plurality of slave nodes, and receiving, by the controller, via the initial node, a second reply from the second addressed node in response to transmitting the second command.

In another example, the disclosure is directed to a method that includes transmitting, by a controller of a battery management system, from a master node of an inter-block communication network and via an first node from a plurality of slave nodes of the inter-block communication network, a command to a first addressed node from the plurality of slave nodes. The method further includes, responsive to transmitting the command: receiving, by the controller, via a second node from the plurality of slave nodes, a first reply from the first addressed node, and receiving, by the controller, via the first node, a second reply from the first addressed node that is duplicative of the first reply.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 5D and 5E are conceptual diagrams illustrating communication related power consumption of the example battery system of FIGS. 5A and 5B.

DETAILED DESCRIPTION

Figure 1:
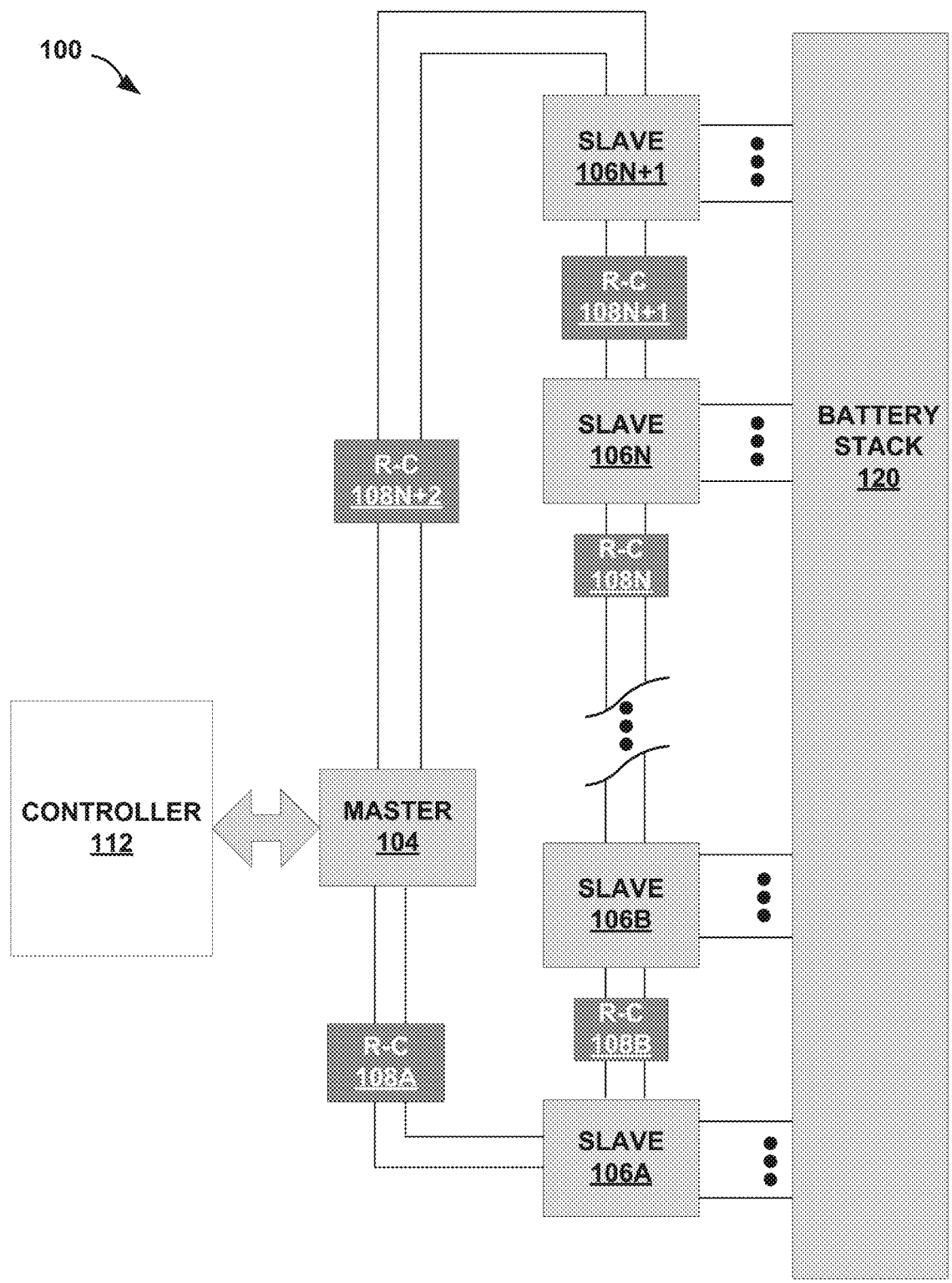
FIG. 1 is a block diagram illustrating an example battery system configured to balance communication related power consumption of blocks of a battery stack, in accordance with one or more aspects of the present disclosure.

In general, circuits and techniques are described for enabling a battery management system to balance the power being drawn by the blocks of an inter-block communication network. The example inter-block communication network may include a ring-type, daisy-chain of slave nodes with a first slave node in the chain being coupled to a master node that is coupled to the controller. Unlike other inter-block communication networks of other battery systems, the example inter-block communication network of the example battery system is not simply terminated by a final slave node in the network. Instead, the example inter-block communication network is configured in a ring topology in which both the first slave node and the final slave node in the daisy-chain are coupled to the master node. Rather than automatically terminating a command message at an addressed node in the inter-block communication network, or automatically inversing the direction of communications during the reply phase of the inter-block communication network, the ring topology of the example inter-block communication network enables the inter-block communication network to transmit command and reply messages through the network so that, over-time, each node in the network draws approximately the same amount of communication related power from its respective block.

For example, in some versions, an example inter-block communication network acts as an alternating master-on-top (MoT) and master-on-bottom (MoB) network. In the alternating MoT and MoB implementation, the slave nodes of the inter-block communication network may be configured to forward command messages through the entire communication network (e.g., without terminating the command message at an addressed node) and may be further configured to send reply messages in the same direction in which command messages are received. Lastly, the controller of the alternating MoT and MoB implementation may cause the master node to alternate, after transmission of each command message, the direction that the master node broadcasts a command message to the network.

In other versions, an example inter-block communication network acts as a fixed MoT or MoB network. In the fixed MoT or MoB implementation, the slave nodes of the inter-block communication network may be configured to forward command messages through the entire communication network (e.g., without terminating the command message at an addressed node). Unlike the alternating MoT and MoB implementation however, the slave nodes may be further configured to send instances of reply messages in the both direction through the network. In other words, an addressed node may send a first instance of a reply message in the same direction in which command messages are received as well as a second instance of the same reply message in the opposite direction in which the command message was received.

In this way, each version of the example inter-block communication network described herein may balance the amount of communication related power being drawn by each slave node from its respective battery block. By evenly distributing, over-time, the quantity of command and reply broadcasts that each slave node has to perform on the network, each slave node on the network may consume approximately the same amount of power communicating on the network. Implementing an example inter-block communication network such as this may lead to an overall balance in communication related power consumption amongst the blocks. A consistent balance in communication related power consumption amongst the blocks may cause an overall, reduced charging time of the battery system.

FIG. 1 is a block diagram illustrating system 100 as an example battery system configured to balance communication related power consumption of blocks of a battery stack, in accordance with one or more aspects of the present disclosure. System 100 represents any type of battery management system, particularly in the field of high-voltage battery management. For example, system 100 may form part of an electric energy storage system of an electric or hybrid-electric automobile, a commercial or home electrical energy storage system, or any other type of electrical energy storage system that relies on an inter-block communication system to manage energy storage at individual battery blocks of the system. System 100 includes controller 112, battery stack 120, master node 104, an "n+1" quantity of slave nodes 106A-106N+1 (collectively "slave nodes 106"), and an "n+2" quantity of coupling elements 108A-108N+1 (collectively "coupling elements 108"), where n is any integer greater than or equal to one.

Battery stack 120 represents a high-voltage battery system that includes any quantity of series connected, and lower-voltage, battery cells that store electrical energy used to power a system (e.g., an electric propulsion system for an automobile). The voltage of battery stack 120 at a particular time corresponds to a sum of the individual voltage of each cell in battery stack 120 at that time. For example, battery stack 120 may include one hundred fifty individual battery cells that when combined in series, provide the voltage required by system 100. To facilitate battery management of system 100, the battery cells of battery stack 120 may be grouped into blocks of one or more cells with each block having its own monitoring and balancing electronics. For example, each block may include a single cell, twelve cells, fourteen cells, sixteen cells, or any other quantity of cells that may be required for battery management.

Controller 112 performs functions related to battery management on behalf of system 100 including being configured to control electrical charging and discharging of a plurality of blocks of a battery stack 120. As some examples, controller 112 may monitor the overall voltage of battery stack 120 as well as the voltage of the individual blocks of battery stack 120 to determine whether to initiate charging or enable discharging of the electrical energy stored by battery stack 120. Controller 112 may comprise any suitable arrangement of hardware, software, firmware, or any combination thereof, to perform the techniques attributed to controller 112 that are described herein. Controller 112 may be coupled to master node 104 via a communication interface that controller 112 shares with master node 104 (e.g., a serial peripheral interface [SPI] bus). Controller 112 may initiate a command via master node 104 that is addressed to one or more of slave nodes 106 and causes the one or more addressed node to report back a voltage status in a reply. Controller 112 and master node 104 may be powered separately from slave nodes 106 and therefore do not draw current from a cell of battery stack 120, therefore does not generate communication related power imbalance.

Controller 112 may include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 112 includes software or firmware, controller 112 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

Master node 104, slave nodes 106, and coupling elements 108 form an inter-block communication network of system 100. Master node 104 and slave nodes 106 are arranged in a ring-type daisy-chain configuration along a low-side bus and a high-side bus. Master node 104 is coupled to controller 112 and configured to initiate all command messages sent through the inter-block communication network over the high-side bus and terminate all reply messages sent through the inter-block communication network via the low-side bus. Each of master node 104 and slave nodes 106 is communicatively coupled to the-low side bus and high-side bus of the inter-block communication network via one or more of coupling elements 108. Due to their relative positioning with respect to master node 104, slave nodes 106 are bounded by slave node 106A which acts as an initial node coupled to master node 104 and slave node 106N+1 which acts as a last node or "final node" coupled to master node 104.

Each of coupling elements 108 represents an individual RC (resistor-capacitor) or RCL (resistor-capacitor-inductor) type coupling circuit for communicatively coupling nodes 104 and 106 to the low-side and high-side buses of the inter-block communication network of system 100. For example: when communicating up the chain (e.g., in a direction that goes from master node 104 via slave node 106A and to slave node 106N+1) slave node 106A may listen, via coupling element 108A, to the low-side and high-side bus in order to detect a command being transmitted from master node 104; slave node 106B may listen, via coupling element 108B, to the low-side and high-side bus in order to detect a command or reply being relayed up the chain from slave node 106A, and so on. Similarly, when communicating down the chain (e.g., in a direction that goes from master node 104 via slave node 106N+1 and to slave node 106A) slave node 106N+1 may listen, via coupling element 108N+1, to the low-side bus and high-side bus in order to detect a command being transmitted from master node 104; slave node 106B may listen, via coupling element 108N, to the low-side and high-side bus in order to detect a command or reply being relayed down the chain from slave node 106N+1, and so on.

Each of slave nodes 106 includes monitoring and balance electronics associated with a different battery block of battery stack 120. For example, slave nodes 106 may each include a voltage monitoring circuit that detects the voltage level of a particular battery block of battery stack 120 and reports the detected voltage back as data to controller 112. As described in greater detail below, each of slave nodes 106 may include a respective current balancing unit to compensate for variations in power consumption due to differences in parasitic capacitances amongst the transmission lines that are coupling nodes 104 and 106 to the network. Each of slave nodes 106 also includes communication electronics for interpreting a command based on data received from controller 112 and packaging a measured voltage level into data for a reply message that gets transmitted back to controller 112. Each slave node 106 may draw power needed for each phase of communication (e.g., transmit and reply) on the network from its respective battery block.

As an example, slave node 106A may receive a command message via the inter-block communication network from master node 104, determine the command message is addressed to slave node 106A, and perform an action in response to the command (e.g., slave node 106A may close a switch that completes a voltage detection circuit for measuring the voltage level of a battery block of stack 120). Slave node 106A may package the detected voltage into a data reply message and send the data reply message via the inter-block communication network back to master node 104.

As described below in greater detail, by arranging master node 104 and slave nodes 106 in a ring-type (also referred to herein as being "circular") daisy-chain configuration, controller 112 may cause each of slave nodes 106 to draw approximately the same amount of power performing communication related operations of system 100.

Controller 112 may cause commands from master node 104 to pass all slave nodes 106 from one side of the daisy-chain and come back to master node 104 from the other side of the daisy-chain. Controller 112 may further cause replies from slave nodes 106 to reach master node 104 from both sides of the daisy-chain.

Controller 112 may cause master node 104 and slave nodes 106 to, over-time, transmit and receive the same quantity of command and reply messages on the network. In doing so, regardless as to the position of each of slave nodes 106 along the chain relative to master node 104, controller 112 may cause each of nodes 106 to, over time, consume the same amount of communication related power from each of their respective battery blocks of stack 120. Controller 112 may cause each slave node 106 to have the same communication load requiring each slave node 106 to transmit and receive the same quantity of bits.

In this way, controller 112 may enable battery stack 120 to experience a shorter balancing time than battery systems that rely on other types of battery management systems. The shorter balancing time may enable battery stack 120 to have a faster charging time as compared to these other battery systems.

Figure 2:
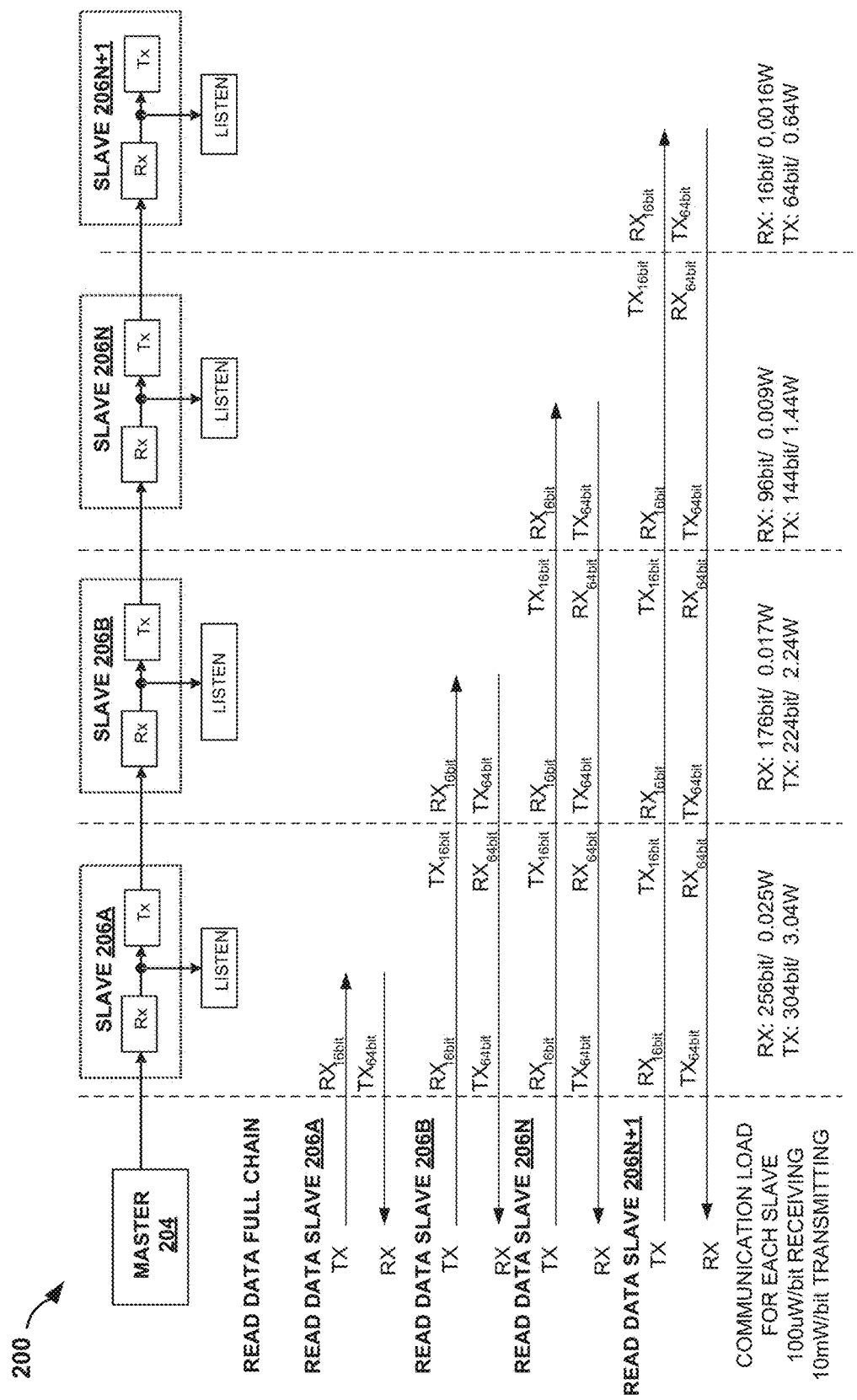
FIG. 2 is a conceptual diagram illustrating communication related power consumption of a traditional battery system that is configured to implement a traditional inter-block communication network.

FIG. 2 is a conceptual diagram illustrating communication related power consumption of system 200 which represents a traditional battery management system that is configured to implement a traditional (i.e., non-circular) inter-block communication protocol. System 200 includes master node 204 coupled to a controller (not shown in FIG. 2) and slave nodes 206A-206N+1. System 200 includes a traditional, non-circular daisy chain inter-block communication network. In other words, unlike system 100 of FIG. 1 that includes a ring-type or circular daisy-chain inter-block communication network, the communication network made up of master node 104 and slave nodes 106 is non-circular and instead has a definite, initial position and a definite, final position. Slave node 206A of system 200 is at the initial position of the non-circular daisy-chain and slave node 206N+1 is at the final position of the non-circular daisy-chain.

Every command being transmitted from master 204 enters the communication network of system 200 via slave 206A. Each of slave nodes 206A may listen to a low-side bus interface and replicate the command data received via the low-side bus interface, via a high-side bus interface and up the chain, until the command data reaches an addressed node (e.g., equaling any one of slave nodes 206 up to and including slave node 206N+1). During a reply phase of the network, the direction of bus communication may be inverted. The addressed node 206 may reply to the command by transmitting reply data via the high-side bus interface and back down the chain. Each subsequent slave node 206 in the network, below the addressed node 206, may replicate the reply data received via the high side bus interface to the low side bus interface until the reply data reaches master node 204.

By having to more frequently replicate broadcast and replies on the network, the one or more slave nodes 206 (e.g., slave node 206A) that are positioned towards the start of the chain (e.g., nearest to master node 204) may consume more power, over time, than the one or more slave nodes 206 (e.g., slave node 206N+1) located near the end of the chain (e.g., furthest from the master node 204). For example, FIG. 2 shows the total quantity of bits and amount of power drawn by each of slave nodes 206 during sequential commands down the chain.

During an initial command addressed to slave node 206A, slave node 206A may receive 16 bits of data from master 204 and in response transmit 64 bits of data. During a subsequent command addressed to slave node 206B, slave node 206A may receive a total of 16+64 bits of data and transmit a total of 64+16 bits of data, while slave node 206B may receive 16 bits of data and transmit a total of 64 bits of data. During a third command addressed to slave node 206N, slave node 206A and slave node 206B may each receive a total of 16+64 bits of data and transmit a total of 64+16 bits of data, while slave node 206N may receive 16 bits of data and transmit a total of 64 bits of data. Lastly, during a final command addressed to slave node 206N+1, slave nodes 206A, 206B, and 206N may each receive a total of 16+64 bits of data and transmit a total of 64+16 bits of data, while slave node 206N+1 may receive 16 bits of data and transmit a total of 64 bits of data. In total, over the course of the four transmissions, each of slave nodes 206 draws a different amount of power from its respective battery cell as slave node 206A may transmit 304 bits of data and receive 256 bits of data, slave node 206B may transmit 224 bits of data and receive 176 bits of data, slave node 206N may transmit 144 bits of data and receive 96 bits of data, and slave node 206N+1 may transmit 64 bits of data and receive 16 bits of data.

Therefore, implementing a traditional inter-block communication network such as the network shown in FIG. 2 shows that a non-circular inter-block communication protocol may lead to an overall imbalance in communication related power consumption amongst the blocks of a battery system. Since imbalance in the cell system leads to longer charging times and less overall battery capacity, a consistent imbalance in power consumption amongst the blocks due to intrinsically necessary communication power draw is undesired.

Figure 3:
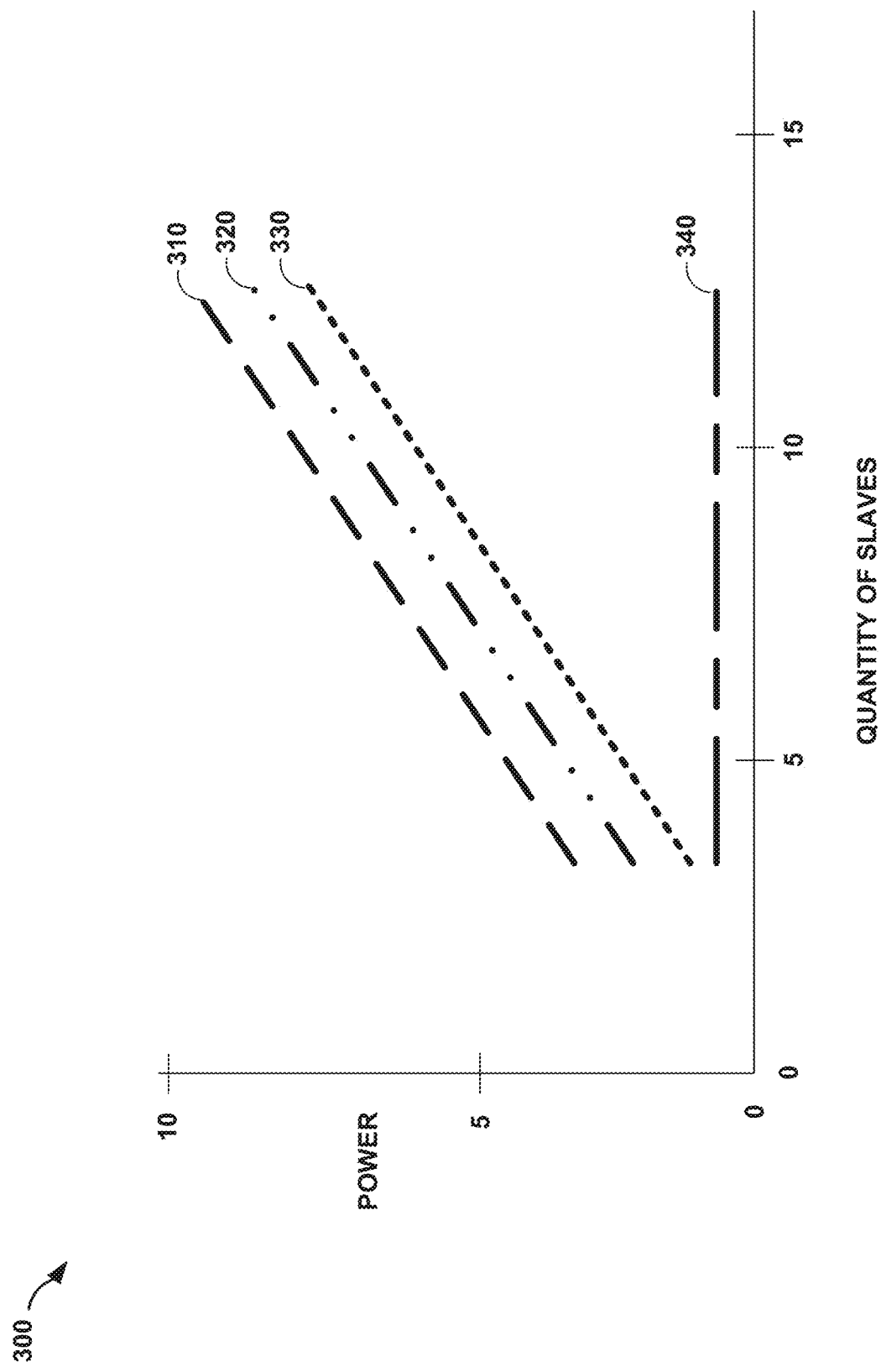
FIG. 3 is a conceptual diagram illustrating communication related power consumption of individual slave nodes of a traditional inter-block communication chain.

FIG. 3 is a conceptual diagram illustrating communication related power consumption of individual slave nodes of a traditional inter-block communication chain such as the inter-block communication chain of system 200 of FIG. 2. For ease of description, FIG. 3 is described within the context of system 200 of FIG. 2. FIG. 3 shows chart 300 which illustrates the total, communication related power consumption (e.g., watts) of each of slave nodes 206 depending on the total quantity "n" of slave nodes.

For example, waveform 310 shows the projected amount of power consumed by slave node 206A which is the initial slave node in a non-ring-type or non-circular inter-block communication network, waveform 320 shows the projected power consumed by slave node 206B which is the second slave node in a non-ring-type or non-circular inter-block communication network, waveform 330 shows the projected power consumed by slave node 206N which is the third slave node in a non-ring-type or non-circular inter-block communication network, and waveform 340 shows the projected power consumed by slave node 206N+1 which is the final slave node (FN) in a non-ring-type or non-circular inter-block communication network.

As shown in FIG. 3 and a comparison between waveforms 310-340, when a non-ring-type or non-circular inter-block communication network includes twelve slave nodes, the final node needs approximately ⅑ the power of slave node 206A (e.g., the initial slave node in the chain). This imbalance of communication power being drawn from the blocks of cells of a battery system may result in a longer passive balancing, resulting in a longer charging time.

Figure 4A:
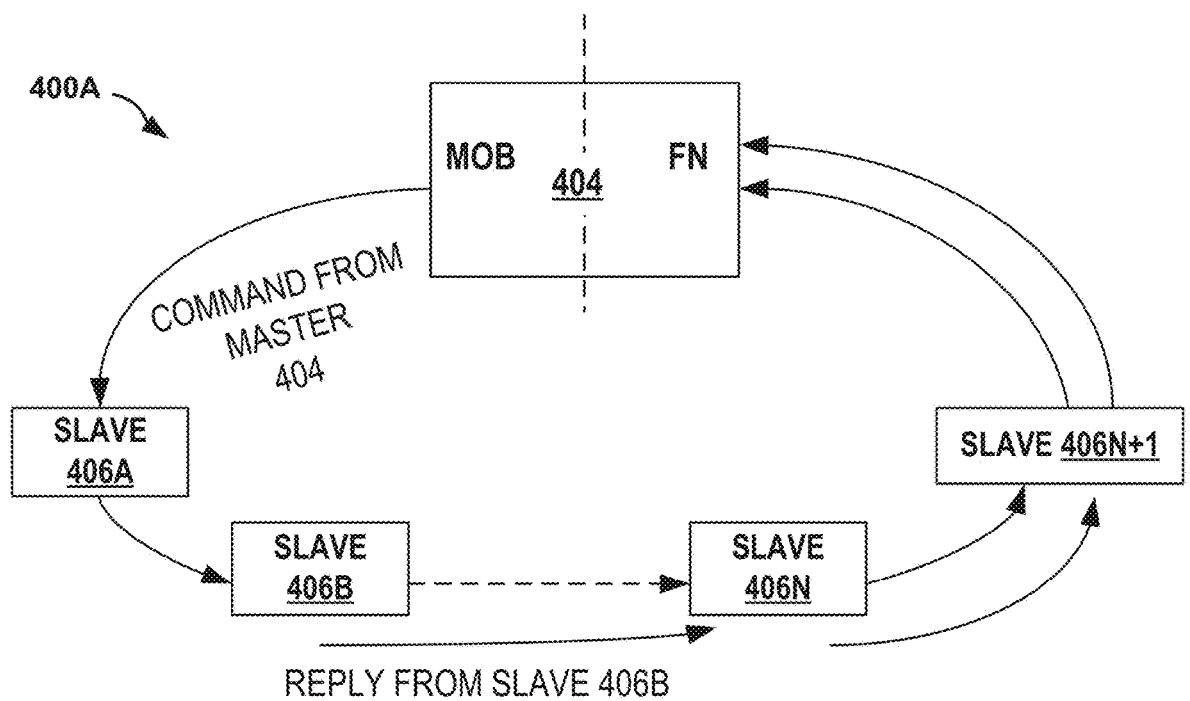
FIGS. 4A and 4B are conceptual diagrams illustrating example inter-block communication networks of an example battery system configured to balance communication related power consumption of blocks of a battery stack, in accordance with one or more aspects of the present disclosure.
Figure 4B:
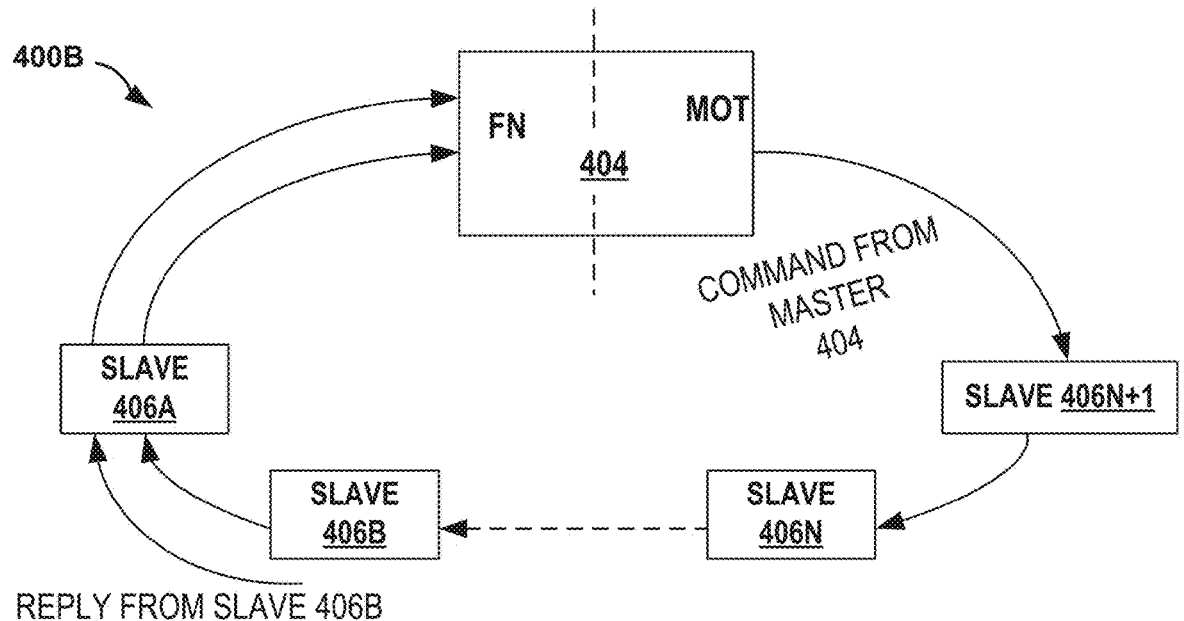

FIGS. 4A and 4B are conceptual diagrams illustrating systems 400A and 400B, respectively, as example battery systems configured to balance communication related power consumption of blocks of a battery stack, in accordance with one or more aspects of the present disclosure. Systems 400A and 400B each include master node 404 and a plurality of slave nodes 406A-406N+1 (collectively "slave nodes 406"). Master node 404 is analogous to master node 104 of system 100 and slave nodes 406 are each analogous to slave nodes 106 of system 100. Systems 400A and 400B are described below in the context of system 100 of FIG. 1. Although not shown, systems 400A and 400B may include coupling elements, a battery stack and a controller that are analogous to coupling elements 108, battery stack 120 and controller 112 of system 100. Systems 400A and 400B are described below as being controlled by controller 112 of system 100.

System 400A and system 400B together, show a first version of the ring-type communication network of system 100 in which controller 112 may cause the ring-type inter-block communication network to alternate between MoT mode and MoB mode. System 400A shows an example of system 100 operating in MoB mode to implement the ring-type communication network of system 100 and system 400B shows an example of system 100 operating in MoT mode to implement the ring-type communication network of system 100. Controller 112 may be configured to control the inter-block communication network of systems 100 by alternating between the one-way MoB messaging scheme illustrated as system 400A of FIG. 4A and the one-way MoT messaging scheme illustrated as system 400B of FIG. 4B.

With reference to FIG. 4A, when controlling an inter-block communication network in a one-way MoB messaging scheme, controller 112 may cause master node 404 to transmit, via the initial node 406A, a command to an addressed node (e.g., any of nodes 406) and receive, via the last node or final node 406N, a reply from the addressed node. For example, controller 112 may cause master node 404 to transmit a command that is addressed to slave node 406B by initially transmitting the command to slave node 406A. Slave node 406A may relay the command to slave node 406B. Upon receipt of the command from master node 404, slave node 406B may send a reply up the chain to slave nodes 406N and 406N+1 until the reply reaches master node 404.

In addition to transmitting the reply up the chain, slave node 406B may also relay the original command received from master node 404. In other words controller 112 may be further configured to cause the addressed node 406B to forward, through the inter-block communication network and to the last node 406N+1, the command and the reply when controlling the inter-block communication network in the one-way MoB messaging scheme. In the end, master node 404 receives from slave node 406N+1, a copy of the original command that master node 404 transmitted to slave node 406A as well as a reply from slave node 406B.

In the example above, slave nodes 406A and 406B may have consumed a lesser amount of power implementing the one-way MoB messaging scheme as compared to all the other slave nodes 406. That is, each of slave nodes 406N-406N+1 received copies of the command and reply and transmitted copies of the command and reply whereas slave node 406A only received and transmitted a copy of the command and slave node 406B only received a copy of the command and transmitted copies of the command and reply.

In order to balance out the power consumed by the ring-type inter-block communication network, controller 112 may alternate the messaging scheme in a subsequent command such that system 100 implements the one-way MoT messaging scheme illustrated as system 400B of FIG. 4B. In other words, in some examples, controller 112 may be configured to switch between controlling the inter-block communication network using the one-way MoT messaging scheme or the one-way MoB messaging scheme each time the master node receives the reply.

With reference to FIG. 4B, when controlling an inter-block communication network in a one-way MoT messaging scheme, controller 112 may cause master node 404 to transmit, via the last node or final node 406N, a command to an addressed node and receive, via the initial node 406A, the reply from the addressed node. For example, controller 112 may cause master node 404 to transmit a command that is addressed to slave node 406B by initially transmitting the command to slave node 406N+1. Slave node 406N+1 may relay the command down the chain to slave node 406N, which relays the command further down the chain until eventually slave node 406B receives the command. Upon receipt of the command from master node 404, slave node 406B may send a reply down the chain to slave nodes 406A until the reply reaches master node 404.

In addition to transmitting the reply down the chain, slave node 406B may also relay the original command received from master node 404. That is, controller 112 may be further configured to cause the addressed node 406B to forward, through the inter-block communication network and to the initial node 406A, the command and the reply when controlling the inter-block communication network in the one-way MoT messaging scheme. In the end, master node 404 receives from slave node 406A, a copy of the original command that master node 404 transmitted to slave node 406N+1 as well as a reply from slave node 406B.

This time, in the example above, slave nodes 406A and 406B may have consumed a greater amount of power implementing the one-way MoT messaging scheme as compared to all the other slave nodes 406. That is, each of slave nodes up the chain from slave node 406B only received copies of the command and only transmitted copies of the command whereas slave node 406B received and transmitted a copy of the command and transmitted a copy of the reply, and slave node 406A both received and transmitted copies of the command and reply. However, the resulting imbalance from the one-way MoT transmission is offset by the resulting imbalance from the earlier one-way MoB type transmission. That is, by alternating between a one-way MoT communication scheme and a one-way MoB communication scheme, controller 112 may cause the inter-block communication network to consume a balanced amount of power across all slave nodes in the network.

Figure 4C:
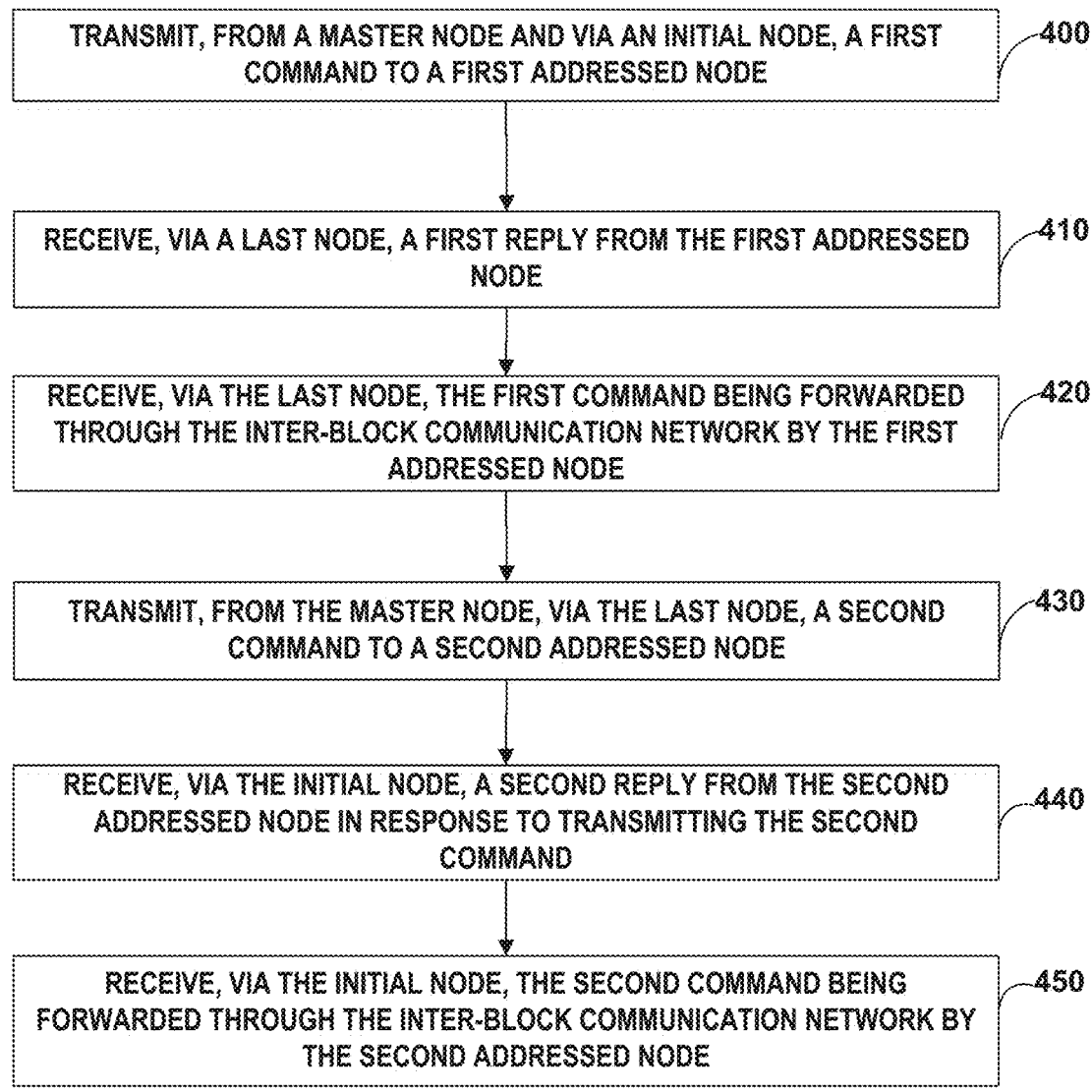
FIG. 4C is a flow diagram illustrating example operations performed by the example battery systems of FIGS. 4A and 4B.

FIG. 4C is a flow diagram illustrating example operations performed by the example battery systems of FIGS. 4A and 4B. FIG. 4C is described below in the context of controller 112 of system 100 of FIG. 1 controlling the components of systems 400A and 400B of FIGS. 4A and 4B.

In operation, controller 112 may transmit, from a master node, a first command to a first addressed node from a plurality of slave nodes (400). For example, when operating in MoB mode, controller 112 may cause master node 404 to transmit a command that is addressed to slave node 406B via slave node 406A. Slave node 406A may forward the command up the chain to slave node 406B. Slave node 406B may receive the forwarded command and in response, forward the command and a reply to the command further up the chain to slave nodes 406N and 406N+1.

Responsive to transmitting the first command, controller 112 may receive, via a last node from the plurality of slave nodes, a first reply from the first addressed node (410). For example, controller 112 may receive, from master node 404, a copy of the reply from addressed node 406B that master node 404 receives from slave node 406N+1.

Controller 112 may receive, via the last node 406N+1, the first command being forwarded through the inter-block communication network by the first addressed node 406B (420). For example, in addition to receiving the copy of the reply, controller 112 may receive, from master node 404 and via slave node 406N+1, a copy of the first command that was sent by master node 404 to addressed node 406B.

After receiving the first reply, controller 112 may transmit, from the master node, via the last node, a second command to a second addressed node from the plurality of slave nodes (430). For example, controller 112 may switch to MoT mode. While operating in MoT mode, controller 112 may cause master node 404 to transmit a command that is addressed to slave node 406B via slave node 406N+1. Slave node 406N+1 may forward the command down the chain to slave node 406B. Slave node 406B may receive the forwarded command and in response, forward the command and a reply to the command further down the chain to initial node 406A.

Controller 112 may receive, via the initial node, a second reply from the second addressed node in response to transmitting the second command (440). For example, controller 112 may receive, from master node 404, a copy of the reply from addressed node 406B that master node 404 receives from slave node 406A.

Controller 112 may receive, via the initial node, the second command being forwarded through the inter-block communication network by the second addressed node (450). For example, in addition to receiving the copy of the reply, controller 112 may receive, from master node 404 and via slave node 406A, a copy of the second command that was sent by master node 404 to addressed node 406B.

Figure 4D:
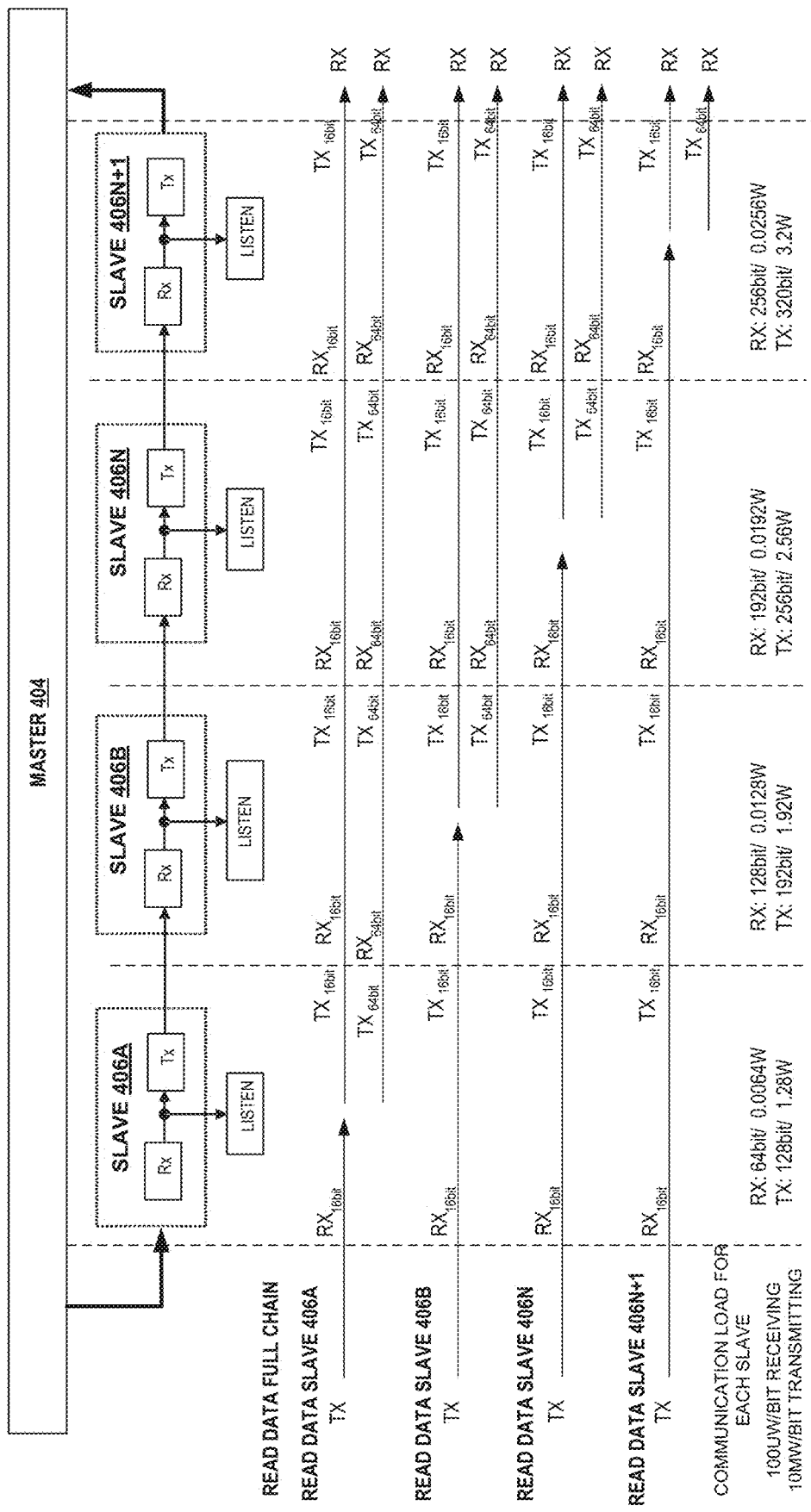
FIGS. 4D through 4F are conceptual diagrams illustrating communication related power consumption of the example battery systems of FIG. 4A and FIG. 4B.
Figure 4E:
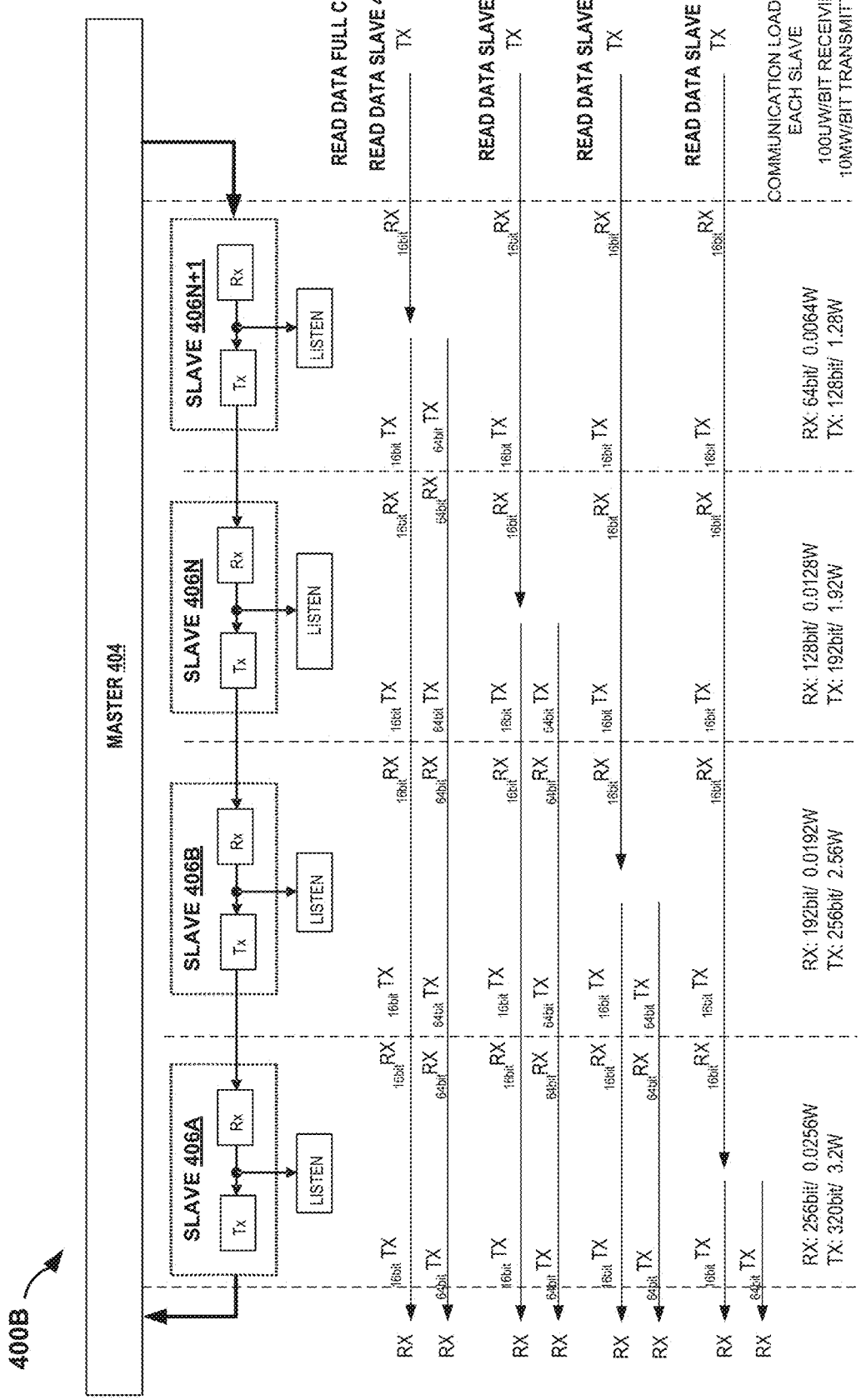
Figure 4F:
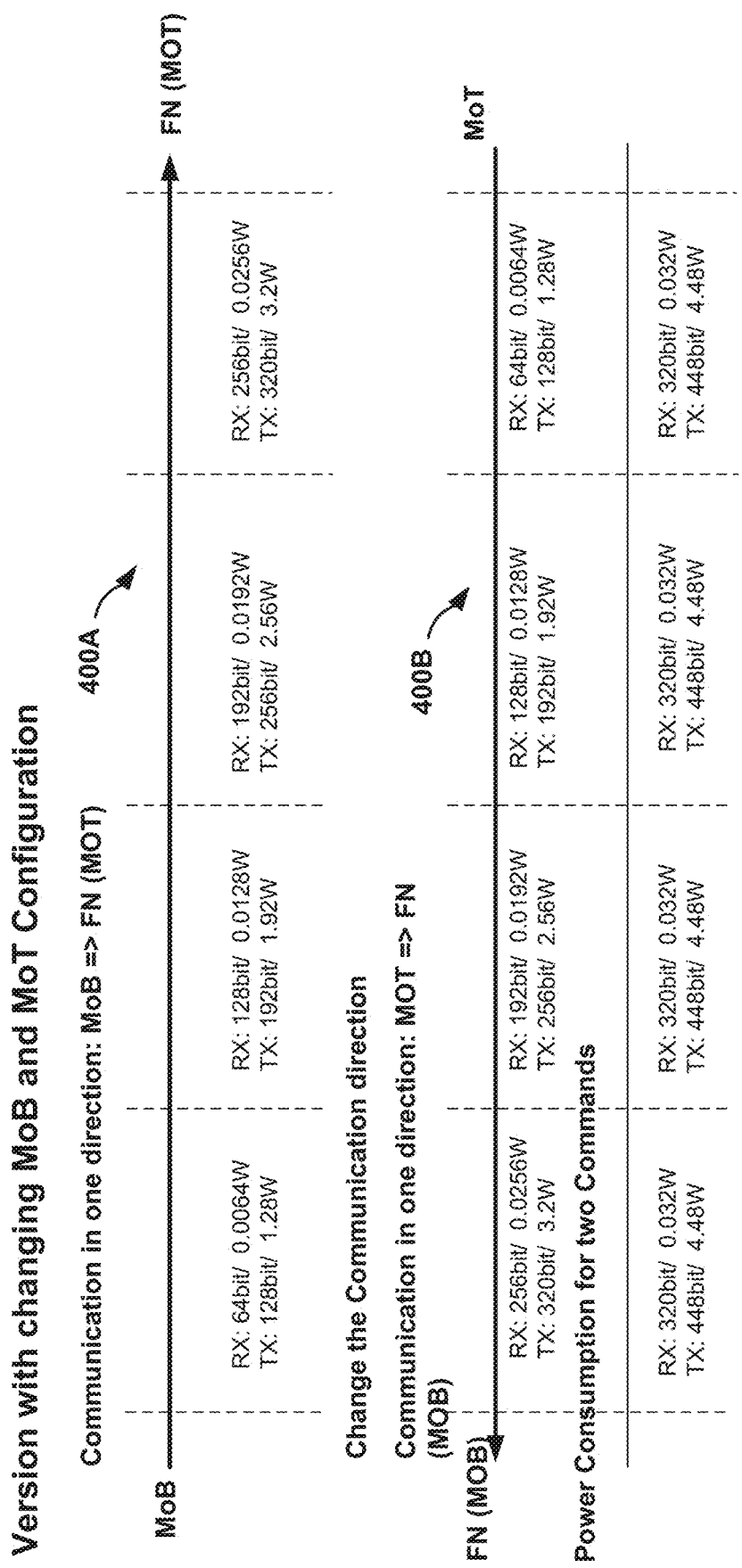

FIGS. 4D through 4F are conceptual diagrams illustrating communication related power consumption of the example battery systems of FIG. 4A and FIG. 4B. FIGS. 4D through 4F are described in the context of FIG. 1 and FIGS. 4A through 4C.

As shown in FIG. 4D, when controller 112 is operating in MoB mode, every command being transmitted from master 404 enters the communication network of system 400A via slave 406A. Each of slave nodes 406 may replicate command data up the chain, until the command data reaches a last node or a final node 406N+1 and at which point exits the network back to master 404. During a reply phase of the network, the direction of bus communication may continue to move in the same direction as during the command phase. The addressed node 406 may reply to the command by transmitting reply data up the chain until the command data reaches a last node or a final node 406N+1 and at which point exits the network back to master 404.

As shown in FIG. 4E, when controller 112 is operating in MoT mode, every command being transmitted from master 404 enters the communication network of system 400B via slave 406N+1. Each of slave nodes 406 may replicate command data down the chain, until the command data reaches an initial node 406A and at which point exits the network back to master 404. During a reply phase of the network, the direction of bus communication may continue to move in the same direction as during the command phase. The addressed node 406 may reply to the command by transmitting reply data down the chain until the command data reaches an initial node 406A and at which point exits the network back to master 404.

As shown in FIG. 4F, the power consumption for two commands, the first moving up the chain in MoB mode and the second moving down the chain in MoT mode, causes each of slave nodes 406 to transmit the same quantity of bits and therefore consume approximately the same amount of power. Note: FIG. 4F illustrates an ideal situation in which all commands and responses through the system have an equal bit length. This communication scheme may therefore prevent an overall imbalance in communication related power consumption amongst the blocks of a battery system and lead to a faster charging time as compared to other battery management communication systems. In addition, by sending the command through the entire chain, master node 404 can double check that the chain is accurately receiving its commands.

Figure 5A:
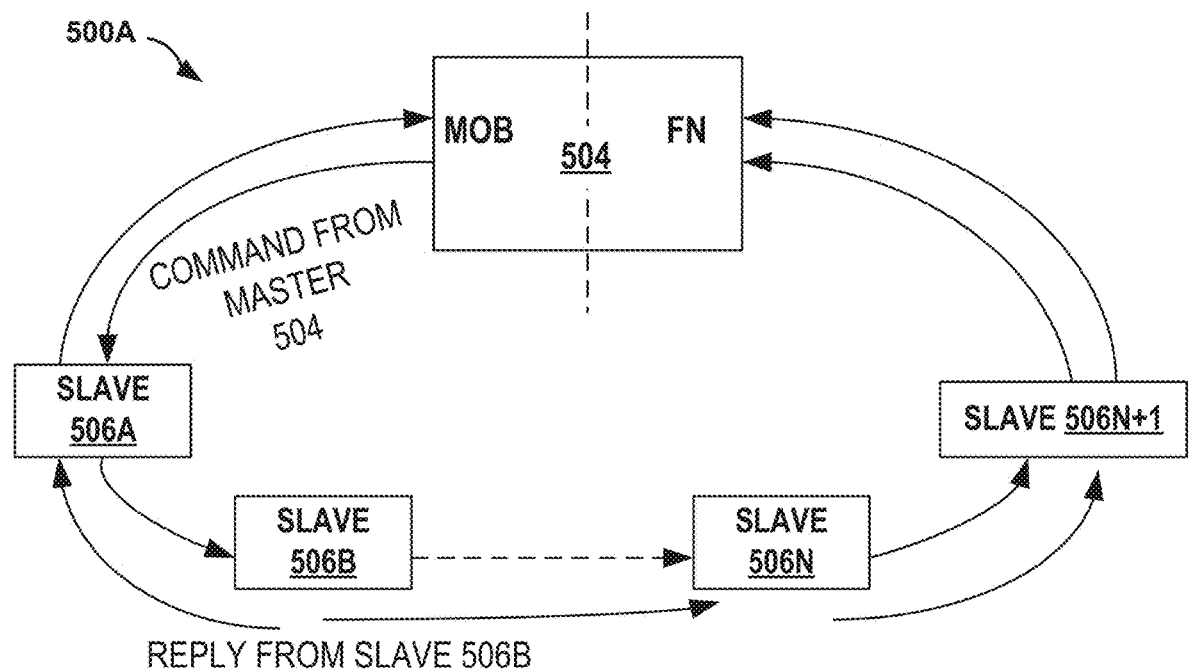
FIGS. 5A and 5B are conceptual diagrams illustrating example inter-block communication networks of an example battery system configured to balance communication related power consumption of blocks of a battery stack, in accordance with one or more aspects of the present disclosure.
Figure 5B:
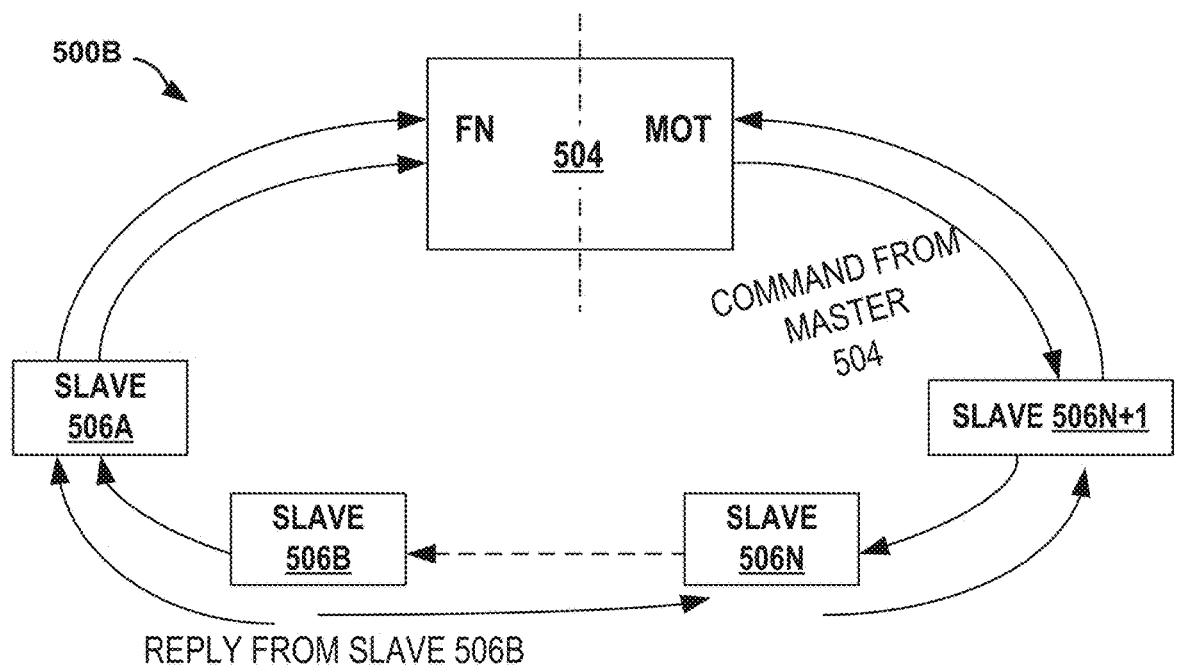

FIGS. 5A and 5B are conceptual diagrams illustrating example battery systems configured to balance communication related power consumption of blocks of a battery stack, in accordance with one or more aspects of the present disclosure. Systems 500A and 500B each include master node 504 and a plurality of slave nodes 506A-506N+1 (collectively "slave nodes 506"). Master node 504 is analogous to master node 104 of system 100 and slave nodes 506 are each analogous to slave nodes 106 of system 100. Systems 500A and 500B are described below in the context of system 100 of FIG. 1. Although not shown, systems 500A and 500B may include coupling elements, a battery stack and a controller that are analogous to coupling elements 108, battery stack 120 and controller 112 of system 100. Systems 500A and 500B are described below as being controlled by controller 112 of system 100.

System 500A and system 500B show two examples of a second version of the ring-type communication network of system 100 in which controller 112 may cause the ring-type inter-block communication network to operate in a fixed, MoT mode or a fixed MoB mode. System 500A shows an example of system 100 operating in a fixed MoB mode to implement the ring-type communication network of system 100 and system 500B shows an example of system 100 operating in a fixed MoT mode to implement the ring-type communication network of system 100. Unlike systems 400A and 400B in which controller 112 alternated between MoB and MoT modes, controller 112 may be configured to control the inter-block communication network of systems 100 by implementing either the one-way MoB messaging scheme illustrated as system 500A of FIG. 5A or by implementing the one-way MoT messaging scheme illustrated as system 500B of FIG. 5B.

With reference to FIG. 5A, when controlling an inter-block communication network in a fixed, one-way MoB messaging scheme, controller 112 may cause master node 504 to transmit, via the initial node 506A, a command to an addressed node (e.g., any of nodes 506) and receive, via the last node or final node 506N+1, a first reply from the addressed node and also receive, via the initial node 506A, a second reply that is duplicative of the first reply. For example, controller 112 may cause master node 504 to transmit a command that is addressed to slave node 506B by initially transmitting the command to slave node 506A. Slave node 506A may relay the command to slave node 506B. Upon receipt of the command from master node 504, slave node 506B may send a reply up the chain to slave nodes 506N and 506N+1 until the reply reaches master node 504. In addition to the reply being sent up the chain, slave node 506B may send a reply down the chain to slave nodes 506A until the reply reaches master node 504.

In addition to transmitting replies up and down the chain, slave node 506B may also relay the original command received from master node 504 up the chain. In other words controller 112 may be further configured to cause the addressed node 506B to forward, through the inter-block communication network and to the last node 406N+1, the command and the reply when controlling the inter-block communication network in the fixed one-way MoB messaging scheme. In the end, master node 504 receives from slave node 506N+1, a copy of the original command that master node 504 transmitted to slave node 506A as well as a reply from slave node 506B and master node 504 additionally receives from slave node 506A a second copy of the reply from slave node 506B.

With reference to FIG. 5B, when controlling an inter-block communication network in a fixed, one-way MoT messaging scheme, controller 112 may cause master node 504 to transmit, via the last node 506N+1, a command to an addressed node (e.g., any of nodes 506) and receive, via the initial node 506A, a first reply from the addressed node and also receive, via the last node 506N+1, a second reply that is duplicative of the first reply. For example, controller 112 may cause master node 504 to transmit a command that is addressed to slave node 506B by initially transmitting the command to slave node 506N+1. Slave node 506N+1 may relay the command to slave node 506B. Upon receipt of the command from master node 504, slave node 506B may send a reply down the chain to slave node 506A until the reply reaches master node 504. In addition to the reply being sent down the chain, slave node 506B may send a reply up the chain to slave nodes 506N+1 until the reply reaches master node 504.

In addition to transmitting replies up and down the chain, slave node 506B may also relay the original command received from master node 504 down the chain. In other words controller 112 may be further configured to cause the addressed node 506B to forward, through the inter-block communication network and to the initial node 506A, the command and the reply when controlling the inter-block communication network in the fixed one-way MoT messaging scheme. In the end, master node 504 receives from slave node 506A, a copy of the original command that master node 504 transmitted to slave node 506N+1 as well as a reply from slave node 506B and master node 504 additionally receives from slave node 506N+1 a second copy of the reply from slave node 506B.

Whether implemented as a MoB network or a MoT network, controller 112 may cause commands and replies to be sent throughout the chain of systems 500A and 500B. In this way, controller 112 may balance out the power consumed by the ring-type inter-block communication network. In addition, by sending the command and the reply, through the entire chain, master node 504 can double check that the chain is accurately receiving its commands and that master node 504 is accurately receiving the reply. Furthermore, the data from slave to master is fail-safe as replies have two paths to return to the master.

Figure 5C:
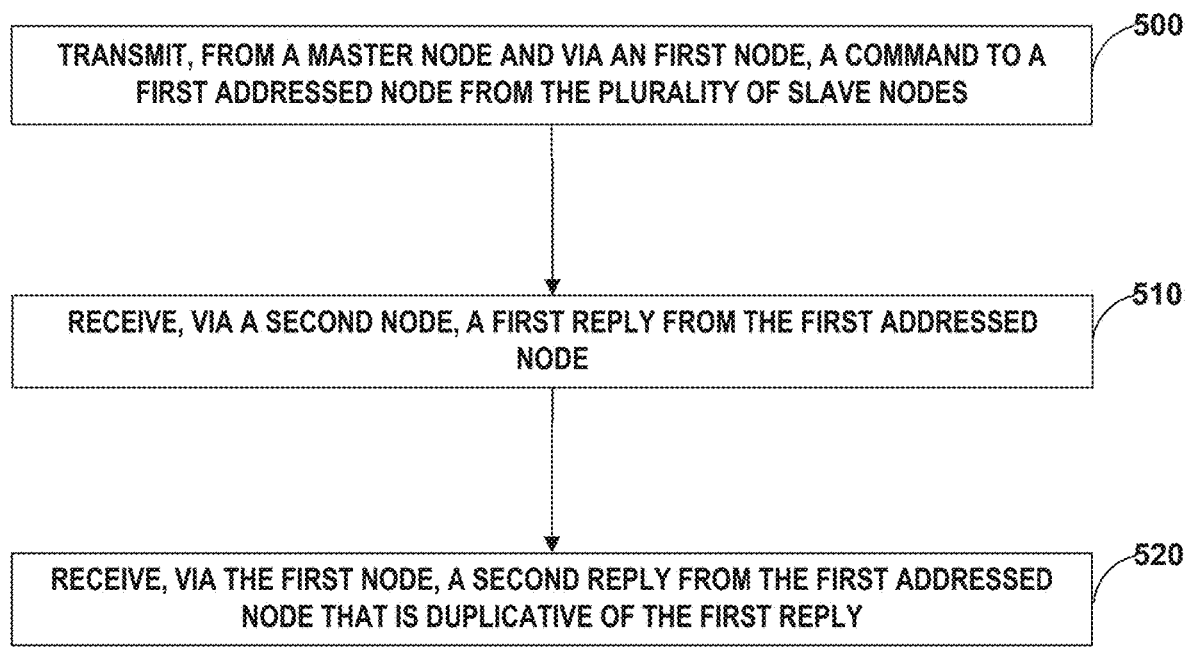
FIG. 5C is a flow diagram illustrating example operations performed by the example battery systems of FIGS. 5A and 5B.

FIG. 5C is a flow diagram illustrating example operations performed by the example battery systems of FIGS. 5A and 5B. FIG. 5C is described below in the context of controller 112 of system 100 of FIG. 1 controlling the components of systems 500A and 500B of FIGS. 5A and 5B.

In operation, with reference to FIG. 5A, when implementing a fixed MoB scheme, controller 112 may transmit, from master node and via a first node from a plurality of slave nodes, a command to a first addressed node from the plurality of slave nodes (500). For example, controller 112 may cause master node 504 to send a command to slave node 506B, via slave node 506A, which replicates the command up the chain until to slave node 506B. In this case, slave node 506A acts as the "first node" in the chain.

Controller 112 may receive, via a second node from the plurality of slave nodes, a first reply from the first addressed node (510). For example, controller 112 may receive from master node 504 a reply to the command. The reply may arrive at master 504 by way of slave node 506N+1 after slave node 506B transmits the reply up the chain. In this case, slave node 506N+1 acts as the "second node" in the chain.

Controller 112 may further receive, via the first node, a second reply from the first addressed node that is duplicative of the first reply (520). For example, controller 112 may receive from master node 504 a second reply to the command, the second reply may arrive at master 504 by way of slave node 506A after slave node 506B transmits a duplicate of the reply down the chain.

With reference to FIG. 5B, when implementing a fixed MoT scheme, controller 112 may repeat operations 500-520, however, rather than slave node 506A acting as the "first node" and slave node 506N+1 acting as the "second node", their roles are reversed. In other words, slave node 506N+1 may act as the "first node" and slave node 506A may act as the "second node"

Figure 5D:
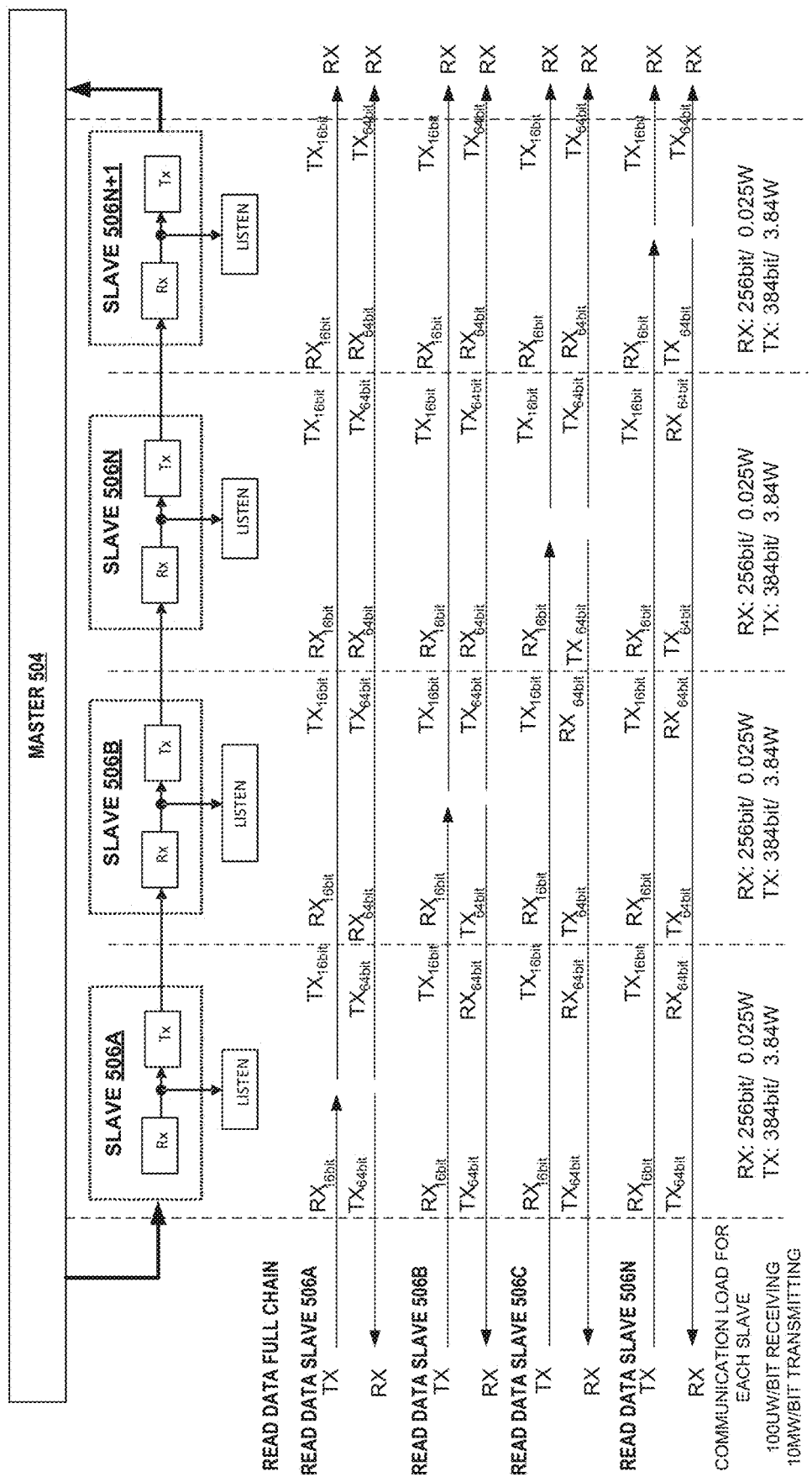

FIGS. 5D and 5E are conceptual diagrams illustrating communication related power consumption of the example battery system of FIGS. 5A and 5B. FIGS. 5D and 5E are described in the context of FIG. 1 and FIGS. 5A through 5C.

As shown in FIG. 5D, when controller 112 is operating in fixed MoB mode, every command being transmitted from master 504 enters the communication network of system 500A via slave 506A. Each of slave nodes 506 may replicate command data up the chain, until the command data reaches a last node or a final node 506N+1 and at which point exits the network back to master 504. During a reply phase of the network, the direction of bus communication may move in both directions along the chain. The addressed node 506 may reply to the command by transmitting reply data both up the chain until the command data reaches a last node or a final node 506N+1 and at which point exits the network back to master 504 and also down the chain until the command data reaches initial node 506A and at which point exits the network back to master 504. Similar power consumption and bit transmissions occur when controller 112 is operating in fixed MoT mode only commands are initiated at the last node 506N+1 and replies are again received at nodes 506A and 506N+1.

As shown in FIG. 5E, the power consumption for two commands, both moving up the chain in a fixed, MoB mode, causes each of slave nodes 506 to transmit the same quantity of bits and therefore consume approximately the same amount of power. This communication scheme may therefore prevent an overall imbalance in communication related power consumption amongst the blocks of a battery system and lead to a faster charging time as compared to other battery management communication systems. In addition, by sending the command through the entire chain, master node 504 can double check that the chain is accurately receiving its commands and that master node 504 is accurately receiving replies to those commands.

Figure 6:
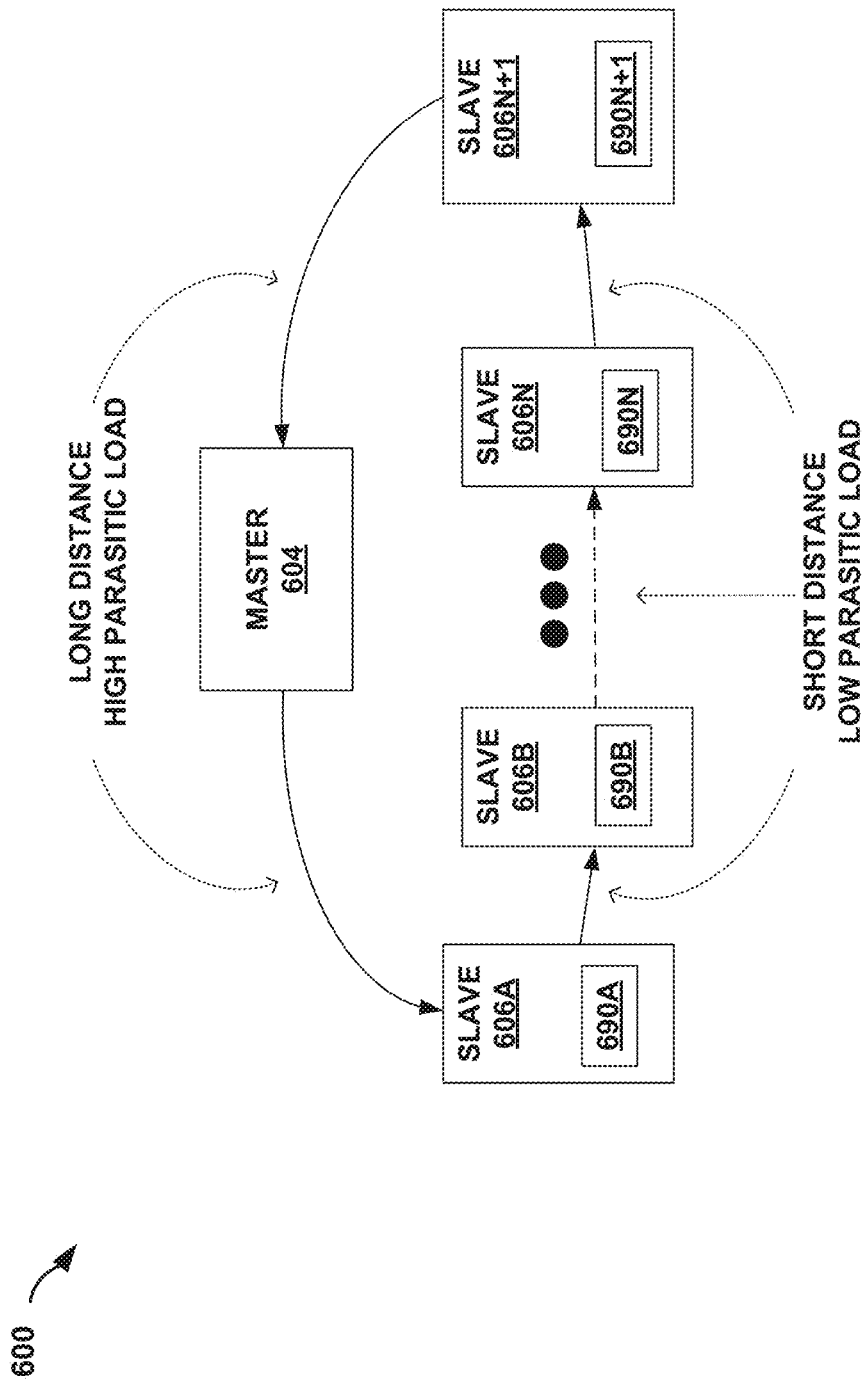
FIG. 6 is a conceptual diagram illustrating an example inter-block communication network of an example battery system configured to balance communication related power consumption of blocks of a battery stack, in accordance with one or more aspects of the present disclosure.

FIG. 6 is a conceptual diagram illustrating system 600 as an example inter-block communication network of an example battery system configured to balance communication related power consumption of blocks of a battery stack, in accordance with one or more aspects of the present disclosure. System 600 include master node 604 and a plurality of slave nodes 606A-606N+1 (collectively "slave nodes 606"). Master node 604 is analogous to master node 104 of system 100 and slave nodes 606 are each analogous to slave nodes 106 of system 100 except each of slave nodes 606 also includes a respective one of current balancing units 690A-690N+1 (collectively "current balancing units 690"). System 600 is described below in the context of system 100 of FIG. 1. Although not shown, system 600 may include coupling elements, a battery stack and a controller that are analogous to coupling elements 108, battery stack 120 and controller 112 of system 100. System 600 is described below as being controlled by controller 112 of system 100.

Controller 112 may operate system 600 as either an alternating MoT and MoB ring-type inter-block communication network or as a fixed, MoT or fixed, MoB, ring-type inter-block communication network described above. System 600 is an enhanced version of systems 400 and 500 in that system 600 also compensates for differences in parasitic capacitances in the transmission lines between nodes in the network.

For example, as shown in FIG. 6, the length of a transmission line, and therefore the parasitic capacitance associated with the transmission line, between master node 604 and the first slave node 606A and the final slave node 606N+1 is generally greater than the length of transmission lines between each of slave nodes 606. This difference in parasitic capacitance may cause the first slave node 606A and the final slave node 606N+1 to draw more current communicating on the network, and therefore consume a greater amount of power communicating on the network, than each of the other slave nodes 606B-606N in the network.

To compensate for this variation in power consumption due to differences in parasitic capacitances amongst the transmission lines that are coupling nodes 604 and 606 to the network, some or all of slave nodes 606 may include a respective current balancing unit 690. Each current balancing unit 690 may adjust the power consumed by each of slave nodes 690, so that the slave nodes 606B-606N that would otherwise consume less power, consume approximately the same amount of power as slave nodes 606A and 606N+1. For example, current balancing units 690 may include resistors or other electrical components that increase the current drawn by one of slave nodes 690 to communicate with a different one of slave nodes 690.

In some examples, although not shown, the first slave node 606A and the final slave node 606N+1 in the network may not include current balancing unit 690. In other examples, current balancing units 690 may be external to slave nodes 606 and instead, included as part of the transmission lines linking slave nodes 606 together. And in other examples, system 600 may forgo the use of current balancing units 690 altogether. Instead, a first type of transmission line may be used by system 600 for linking two slave nodes 606 together that has an inherent parasitic capacitance that matches the inherent parasitic capacitance of a second type of transmission line that is used by system 600 for linking master node 604 to each of the first slave node 606A and the final slave node 606N+1.

Clause 1. A battery management system comprising: a controller configured to control electrical charging and discharging of a plurality of blocks of a battery; and an inter-block communication network including: a master node and a plurality of slave nodes arranged in a ring-type daisy-chain configuration with the master node; the master node being coupled to the controller and configured to initiate all command messages sent through the inter-block communication network and terminate all reply messages sent through the inter-block communication network; and the plurality of slave nodes being bounded by an initial node coupled to the master node and a last node coupled to the master node.

Clause 2. The battery management system of clause 1, wherein the controller is configured to control the inter-block communication network by alternating between: a one-way master-on-bottom messaging scheme in which the controller causes the master node to transmit, via the initial node, a command to an addressed node from the plurality of slave nodes and receive, via the last node, a reply from the addressed node; and a one-way master-on-top messaging scheme in which the controller causes the master node to transmit, via the last node, the command to the addressed node and receive, via the initial node, the reply from the addressed node.

Clause 3. The battery management system of clause 2, wherein the controller is configured to switch between controlling the inter-block communication network using the one-way master-on-top messaging scheme or the one-way master-on-bottom messaging scheme each time the master node receives the reply.

Clause 4. The battery management system of any of clauses 2-3, wherein: the inter-block communication network is configured to forward the command and the reply from the addressed node through the inter-block communication network and to the last node when the controller is controlling the inter-block communication network in the one-way master-on-bottom messaging scheme; and the inter-block communication network is configured to forward the command and the reply from the addressed node through the inter-block communication network and to the initial node when the controller is controlling the inter-block communication network in the one-way master-on-top messaging scheme.

Clause 5. The battery management system of any of clause 1, wherein the controller is configured to control the inter-block communication network using either: a one-way master-on-bottom messaging scheme in which the controller causes the master node to: transmit, via the initial node, a command to an addressed node from the plurality of slave nodes; receive, via the last node, a first reply from the addressed node; and receive, via the initial node, a second reply that is duplicative of the first reply; or a one-way master-on-top messaging scheme in which the controller causes the master node to: transmit, via the last node, the command to the addressed node; receive, via the last node, the first reply from the addressed node; and receive, via the initial node, the second reply that is duplicative of the first reply.

Clause 6. The battery management system of clause 5, wherein: the inter-block communication network is configured to forward from the addressed node the command and the first and second replies through the inter-block communication network and to the last node when the controller is controlling the inter-block communication network in the one-way master-on-bottom messaging scheme; and the inter-block communication network is configured to forward the command and the first and second replies from the addressed node through the inter-block communication network and to the initial node when the controller is controlling the inter-block communication network in the one-way master-on-top messaging scheme.

Clause 7. The battery management system of any of clauses 1-6, wherein the inter-block communication network includes a low-side bus and a high-side bus, and wherein the master node and each of the plurality of slave nodes via the low-side bus and the high-side bus.

Clause 8. The battery management system of any of clauses 1-7, wherein each of the master node and the plurality of slave nodes is coupled to the low-side bus and the high-side bus via a respective resistor-capacitor coupling circuit.

Clause 9. The battery management system of any of clauses 1-8, wherein each slave node from the plurality of slave nodes is associated with a different respective block from the plurality of blocks.

Clause 10. The battery management system of clause 8, wherein each slave node from the plurality of slave nodes comprises respective balancing and monitoring circuitry.

Clause 11. A method comprising: transmitting, by a controller of a battery management system, from a master node of an inter-block communication network and via an initial node from a plurality of slave nodes of the inter-block communication network, a first command to a first addressed node from the plurality of slave nodes; responsive to transmitting the first command, receiving, by the controller, via a last node from the plurality of slave nodes, a first reply from the first addressed node; after receiving the first reply, transmitting, by the controller, from the master node, via the last node, a second command to a second addressed node from the plurality of slave nodes; and receiving, by the controller, via the initial node, a second reply from the second addressed node in response to transmitting the second command.

Clause 12. The method of clause 11, further comprising: receiving, by the controller, via the last node, the first command being forwarded through the inter-block communication network by the first addressed node.

Clause 13. The method of any of clauses 11-12, further comprising: receiving, by the controller, via the initial node, the second command being forwarded through the inter-block communication network by the second addressed node.

Clause 14. The method of any of clauses 11-13, wherein the first addressed node is the second addressed node.

Clause 15. The method of any of clauses 11-14, wherein each slave node from the plurality of slave nodes comprises balancing and monitoring circuitry associated with a different respective block from a plurality of blocks of a battery.

Clause 16. A method comprising: transmitting, by a controller of a battery management system, from a master node of an inter-block communication network and via an first node from a plurality of slave nodes of the inter-block communication network, a command to a first addressed node from the plurality of slave nodes; responsive to transmitting the command: receiving, by the controller, via a second node from the plurality of slave nodes, a first reply from the first addressed node; and receiving, by the controller, via the first node, a second reply from the first addressed node that is duplicative of the first reply.

Clause 17. The method of clause 16, wherein the plurality of slave nodes are arranged in a ring-type daisy-chain configuration with the master node, the plurality of slave nodes being bounded by an initial node coupled to the master node and a last node coupled to the master node.

Clause 18. The method of clause 17, wherein the first node is the initial node and the second node is the last node.

Clause 19. The method of clause 17, wherein the first node is the last node and the second node is the initial node.

Clause 20. The method of any of clauses 16-19, wherein each slave node from the plurality of slave nodes is associated with a different respective block from a plurality of blocks of a battery.

Clause 21. A system comprising means for performing any of the methods of clauses 11-20.

Clause 22. A computer-readable storage medium comprising instructions, that when executed, causes at least one processor of a controller of a system to perform any of the methods of clauses 11-20.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:
1. A method comprising:
 causing, by a controller of a battery management system, a master node of an inter-block communication network to transmit, via a first node from a plurality of slave nodes of the inter-block communication network, an original command to an addressed node from the plurality of slave nodes;
 after causing the master node to transmit the original command:

receiving a copy of the original command from a second node after the original command has been transmitted through the plurality of slave nodes;

transmitting, by the addressed node after receiving the original command, a first reply in a first direction through the plurality of slave nodes;

receiving, by the controller, via the second node from the plurality of slave nodes, a copy of the first reply from the addressed node;

transmitting, by the addressed node after receiving the original command, a second reply in a second direction through the plurality of slave nodes, wherein the second direction is opposite from the first direction; and receiving, by the controller, via the first node, a copy of the second reply from the addressed node, wherein the copy of the second reply received by the controller is duplicative of the copy of the first reply received by the controller.

2. The method of claim 1, wherein the plurality of slave nodes are arranged as a chain in a ring-type daisy-chain configuration with the master node, the plurality of slave nodes being bounded by an initial node coupled to the master node and a last node coupled to the master node, the method further comprising transmitting, after causing the master node to transmit the original command, the original command around an entirety of the ring-type daisy-chain configuration to the second node and then to the master node.

3. The method of claim 1, wherein the first and second replies travel in opposite directions round the entirety of a ring-type daisy-chain configuration.

4. The method of claim 1, further comprising transmitting, by the addressed node, the first and second replies in opposite directions around a ring-type daisy-chain configuration.

5. The method of claim 1, wherein the first node is an initial node and the second node is a last node.

6. The method of claim 1, wherein the first node is a last node and the second node is an initial node.

7. The method of claim 1, wherein each slave node from the plurality of slave nodes is associated with a different respective block from a plurality of blocks of a battery.

8. The method of claim 1, wherein each slave node draws power from a respective block from a plurality of blocks of a battery.

9. The method of claim 1, further comprising:

determining, by the addressed node, that the original command is addressed to the addressed node; and closing, by the addressed node, a switch that completes a voltage detection circuit for measuring a voltage level of a battery block of a battery stack.

10. A battery management system comprising:

a controller configured to control electrical charging and discharging of a plurality of blocks of a battery; and an inter-block communication network including a master node and a plurality of slave nodes arranged in a ring-type daisy-chain configuration with the master node, wherein the master node is coupled to the controller and configured to initiate all command messages sent through the inter-block communication network and terminate all reply messages sent through the inter-block communication network, wherein the plurality of slave nodes are bounded by a first node coupled to the master node and a second node coupled to the master node, wherein the controller is configured to control the inter-block communication network by:

causing the master node to transmit an original command via the first node to an addressed node from the plurality of slave nodes; and after causing the master node to transmit the original command:

receiving, by the master node, a copy of the original command from the second node after the original command has been transmitted through the plurality of slave nodes;

receiving, by the master node and via the second node from the plurality of slave nodes, a copy of a first reply from the addressed node; and receiving, by the master node and via the first node, a copy of a second reply from the addressed node, wherein the copy of the second reply received by the master node is duplicative of the copy of the first reply received by the master node, and wherein the addressed node is configured to:

transmit the first reply in a first direction through the plurality of slave nodes after receiving the original command; and transmit the second reply in a second direction through the plurality of slave nodes after receiving the original command, wherein the second direction is opposite from the first direction.

11. The battery management system of claim 10, wherein, after the master node transmits the original command, the plurality of slave nodes transmits the original command around an entirety of the ring-type daisy-chain configuration to the second node and then to the master node.

12. The battery management system of claim 10, wherein the first and second replies travel in opposite directions round the entirety of the ring-type daisy-chain configuration.

13. The battery management system of claim 10, wherein each slave node from the plurality of slave nodes is associated with a different respective block from a plurality of blocks of a battery.

14. The battery management system of claim 10, wherein each slave node draws power from a respective block from a plurality of blocks of a battery.

15. The battery management system of claim 10, wherein the addressed node is configured to:

determine that the original command is addressed to the addressed node; and close a switch that completes a voltage detection circuit for measuring a voltage level of a battery block of a battery stack.

16. A battery management system comprising:

a controller configured to control electrical charging and discharging of a plurality of blocks of a battery; and an inter-block communication network including:

a master node and a plurality of slave nodes arranged in a ring-type daisy-chain configuration with the master node, wherein the controller is configured to cause the master node to transmit an original command to an addressed node via an initial node;

the master node being coupled to the controller and configured to initiate all command messages sent through the inter-block communication network and terminate all reply messages sent through the inter-block communication network; and the plurality of slave nodes being bounded by the initial node coupled to the master node and a last node coupled to the master node, wherein the master node is configured to receive a copy of the original command from the last node after the original command has been transmitted through the plurality of slave nodes, wherein the addressed node is configured to:
- transmit a first reply in a first direction through the plurality of slave nodes after receiving the original command; and
- transmit a second reply in a second direction through the plurality of slave nodes after receiving the original command,
- wherein the second direction is opposite from the first direction, and
- wherein the master node is configured to receive a copy of the first reply and a copy of the second reply that is duplicative of the copy of the first reply received by the master node.

17. The battery management system of claim 16, wherein the controller is able to control the inter-block communication system in either:
- a one-way master on bottom messaging scheme in which the controller causes the master node to transmit, via the initial node, the original command to the addressed node from the plurality of slave nodes and receive, via the last node, a reply from the addressed node; or
- a one-way master-on-top messaging scheme in which the controller causes the master node to transmit, via the last node, the original command to the addressed node and receive, via the initial node, the reply from the addressed node.

18. The battery management system of claim 16,
wherein each slave node from the plurality of slave nodes is associated with a different respective block from the plurality of blocks, and
wherein each slave node from the plurality of slave nodes comprises respective balancing and monitoring circuitry.

19. The battery management system of claim 16, wherein the addressed node is configured to:
- determine that the original command is addressed to the addressed node; and
- close a switch that completes a voltage detection circuit for measuring a voltage level of a battery block of a battery stack.

20. The battery management system of claim 16, wherein each slave node from the plurality of slave nodes draws power from a respective block from the plurality of blocks of the battery.

* * * * *